United States Patent
Den Boer

(10) Patent No.: US 10,154,568 B2
(45) Date of Patent: Dec. 11, 2018

(54) CONTROLLING LIGHTING COMPONENTS IN A LIGHTING INSTALLATION

(71) Applicant: PHILIPS LIGHTING HOLDING B.V., Eindhoven (NL)

(72) Inventor: Reinier Imre Anton Den Boer, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/326,745

(22) PCT Filed: Jul. 8, 2015

(86) PCT No.: PCT/EP2015/065529
§ 371 (c)(1),
(2) Date: Jan. 17, 2017

(87) PCT Pub. No.: WO2016/008774
PCT Pub. Date: Jan. 21, 2016

(65) Prior Publication Data
US 2017/0208666 A1      Jul. 20, 2017

(30) Foreign Application Priority Data
Jul. 17, 2014   (EP) .................................... 14177509

(51) Int. Cl.
*H05B 37/02*      (2006.01)
*G06Q 30/02*      (2012.01)
*G05B 15/02*      (2006.01)
*H05B 33/08*      (2006.01)

(52) U.S. Cl.
CPC ......... *H05B 37/0245* (2013.01); *G05B 15/02* (2013.01); *G06Q 30/0255* (2013.01); *H05B 33/0845* (2013.01); *H05B 37/0227* (2013.01); *Y02B 20/44* (2013.01)

(58) Field of Classification Search
CPC combination set(s) only.
See application file for complete search history.

(56) References Cited

U.S. PATENT DOCUMENTS

2004/0044564 A1    3/2004  Dietz et al.
2014/0132390 A1    5/2014  Loveland et al.

OTHER PUBLICATIONS

Lamonica, Martin, "Philips Creates Shopping Assistant With LEDS and Smart Phone," http://spectrum.ieee.org/tech-talk/computing/networks/philips-creates-store-shopping-assistant-with-leds-and-smart-phone?utm_source=techalert&utm_medium=email&utm_campaign=022014, Posted Feb. 18, 2014 (4 Pages).

*Primary Examiner* — Douglas W Owens
*Assistant Examiner* — Jianzi Chen
(74) *Attorney, Agent, or Firm* — Meenakshy Chakravorty

(57) ABSTRACT

A method of controlling a lighting installation in a space in which a plurality of items are displayed comprises detecting a personal computer device in the space, the personal computer device associated with an anonymized user, and said detection including detecting information on the user device; by using the information detected on the personal computer device, accessing profile data associated with the anonymized user and derived from previous online activity of the anonymized user; determining items likely to be of interest to the anonymized user associated with the personal computer device based on said profile data; and controlling at least one lighting component to provide distinguishing illumination directed towards at least one of the determined items.

16 Claims, 5 Drawing Sheets

CONTROLLING LIGHTING COMPONENTS IN A LIGHTING INSTALLATION

CROSS-REFERENCE TO PRIOR APPLICATIONS

This application is the U.S. National Phase application under 35 U.S.C. § 371 of International Application No. PCT/EP2015/065529, filed on Jul. 8, 2015, which claims the benefit of European Patent Application No. 14177509.8, filed on Jul. 17, 2014. These applications are hereby incorporated by reference herein.

BACKGROUND

The present invention relates to controlling lighting components in a lighting installation which illuminates a space, such as a retail environment.

In a retail environment, lighting is used to provide a customer friendly atmosphere, which provides a good lighting mood for a retail environment, but in addition allows items or articles which are displayed for purchase to be readily visible. In some retail environments individual shelves or cabinets are lit separately from the main retail environment.

Lighting of a retail environment can be expensive and wasteful of energy. It would be desirable to control the lighting of a retail environment in a way which reduces the amount of energy utilised to light the environment, while not reducing the effectiveness of allowing articles or items on display to be properly lit up.

SUMMARY

According to an aspect of the present invention there is provided a method of controlling a lighting installation in a space in which a plurality of items are displayed, the method comprising: detecting a personal computer device in the space, the personal computer device associated with an anonymised user, said detection including detecting information on the user device; by using said information detected on the personal computer device, accessing individual profile data associated with the anonymised user derived from previous online activity of the anonymised user; determining items likely to be of interest to the anonymized user associated with the personal computer device based on said individual profile data; and controlling at least one lighting component to provide distinguishing illumination directed towards at least one of the determined items.

A further aspect provides a computer system for controlling a lighting installation in a space in which a plurality of items are displayed, the computer system comprising: means for detecting a personal computer device in the space, including detecting information on the user device; means for using said information detected on the personal computer device, to access individual profile data associated with an anonymised user linked with the personal computer device, the individual profile data derived from previous online activity of the anonymised user; a controller configured to determine items likely to be of interest to the anonymized user associated with the personal computer device based on said individual profile data, and to generate a control signal for controlling at least one lighting component to provide distinguishing illumination directed towards at least one of the determined items; and a control interface for transmitting the generated control signal to at least one lighting component of a lighting installation in the space.

The invention also provides in another aspect a lighting installation for use in a space in which a plurality of items are displayed, the lighting installation comprising: a computer system as defined above and a plurality of lighting components arranged to provide distinguishing illumination directed towards different regions in the space, wherein the lighting components operate under the control of the computer system to provide distinguishing illumination directed towards items determined to be likely to be of interest to the anonymized user associated with the personal computer device detected in the space.

The step of providing distinguishing illumination can provide relatively enhanced illuminations such as a highlight effect of a different shade or colour. For example, a highlight can be created by giving the highlight a different white colour such as a cool white in a warm white general lighting or a warm white in a cool white basic lighting level. This could also be a dynamic beam with shifting light levels between low and higher light levels. Additionally it could be highlighted by changing cri (colour rendering index) which for example results in a stabile light intensity level, but will shift in CRI for one or more specific colors such as highlighting the colour red with increased intensity.

The lighting component can comprise a fixed array of individual light sources wherein one or more individual light sources are selected to provide a direct beam of the distinguishing illumination. For example, an LED (light emitting diode) accent spot comprising an LED matrix array can be utilised.

Alternatively, the lighting component can be a mechanically moveable spotlight which can be moved to provide a beam of distinguishing illumination directed towards the at least one item.

The means for detecting the user can comprise a location detection module configured to detect to a location identification signal from the user device and to supply the location identification signal to the controller.

For a better understanding of the present invention and to show how the same may be carried into effect, reference will now be made by way of example, to the accompanying drawings.

DETAILED DESCRIPTION OF EMBODIMENTS

According to the following described embodiments of the invention, a method and system operate to couple online purchasing behaviour of an individual with other available information such as the individual's location and provide this information to a controlling system of accent lighting that is able to independently control areas within the light beam in order to highlight merchandise items of interest for this specific individual. The accent lighting can be an LED matrix or other directionally controllable lights. A controllable LED accent spotlight provides beam shape control using multiple LEDs in a single spot. The spots are connected to a central controlling system that has access to an online profile of any individual with a user device such as a smartphone who enters a store. The narrow casting spots can discretely increase the light levels of specific pixels highlighting the items that are matching the individual profile.

A more detailed explanation is given by way of example in the following.

Figure 1:
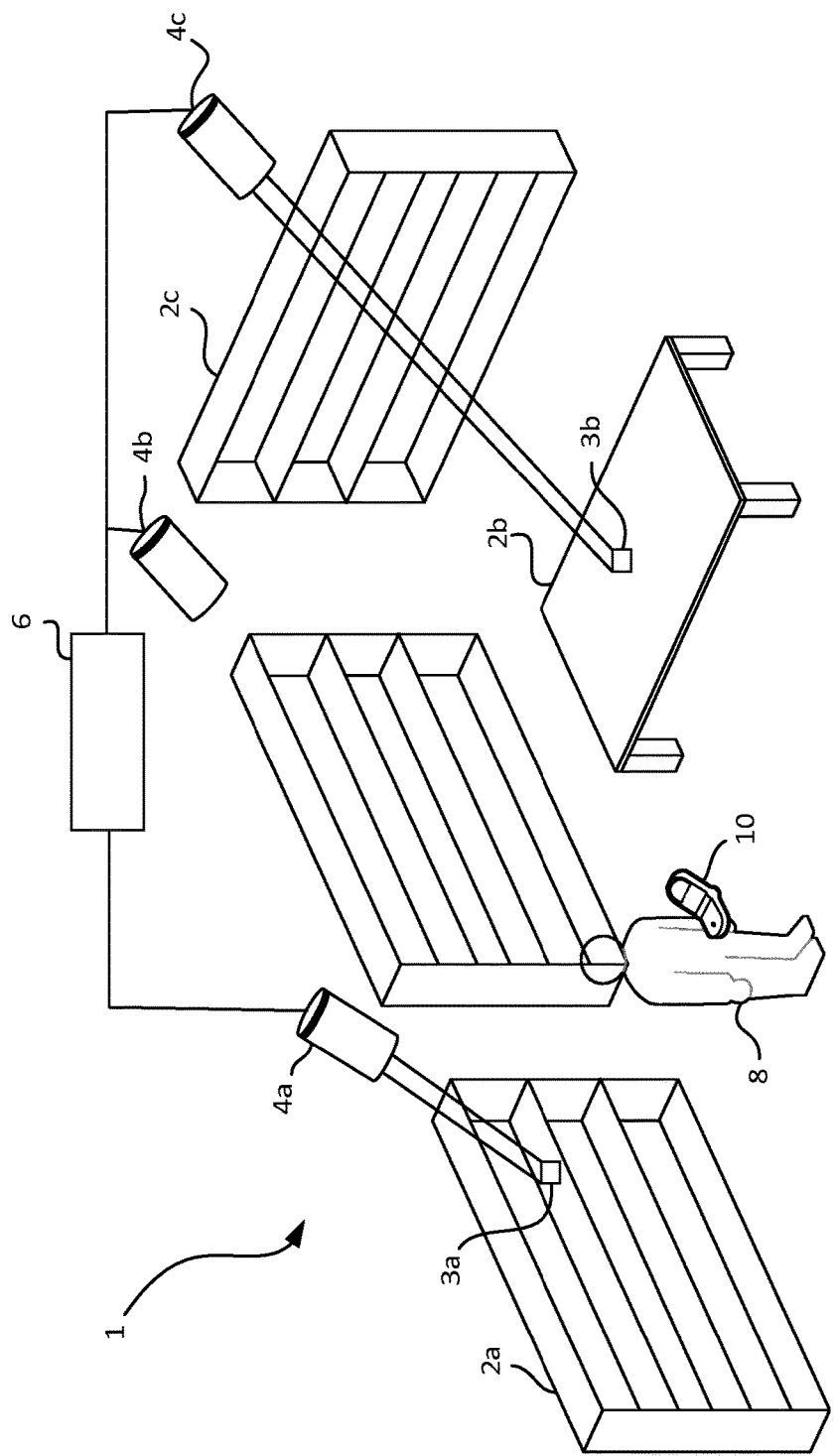
FIG. 1 is a schematic block diagram of a retail environment.

FIG. 1 is a schematic diagram showing the inside of part of a retail environment 1 such as a shop. The retail environment comprises a number of display areas, such as shelves or cabinets denoted 2a, 2b, etc. The display areas 2a, 2b, etc. have goods 3a, 3b (referred to as items or merchandise) on display which can be purchased. The shop is divided into lighting zones which are covered by a series of matrix-spotlights denoted 4a, 4b, etc. Each zone is associated with one or more respective matrix-spotlight. A matrix-spotlight is shown in more detail in FIG. 2 which will be described later. Of importance however the matrix-spotlight can project a more or less exact image of a matrix source onto a specific area in the shop. Thus, the shape and precise location of illumination within the shop can be controlled using these matrix-spotlights. The matrix-spotlights are controlled by a central controller 6. The central controller 6 is a computer system which includes a processor and which can be located in-store or externally of the store and connected to the matrix-spotlight via a suitable communication network. It is noted that at this juncture that although the controller 6 is shown connected to the matrix-spotlight by solid lines, communication between the controller 6 and the matrix-spotlights can be by any suitable communication mechanism, whether wired or wireless. FIG. 1 also illustrates a shopper 8 entering the store. The shopper 8 has a personal computer device 10. The personal computer device can be of any type, including a smartphone, iPad, tablet, etc.

As described later, the controller 6 has access to an online profile of any individual with a personal computer device who enters the store, assuming that the individual has used a smartphone online in the past. Ways in which the controller 6 can gain access to an online profile are discussed later.

When the controller detects the personal computer device, it links it to the presence of an anonymised user who is associated with this personal computer device. This anonymised user is also associated with a specific anonymised larger user profile, which represents the online activity of the user whether on the present detected personal computer device or other devices. For example, the user profile can consist of an interest profile based upon search and web visit history performed on other user devices. Such a history could include purchasing history with the retail environment in which the user is currently located, and/or a purchasing history with other retail environments.

This online profile includes behavioural data about the individual which can guide the controller to determine what items in the retail environment may be of most interest to that individual. Using this information, the controller controls the matrix-spotlights to increase the light levels of part of the matrix pattern that is being cast on a particular area to highlight items that match the individual profile. In this way, the attention of the shopper is automatically attracted to the highlighted item and purchasing is stimulated.

In the main embodiment discussed herein, the location of a customer in the retail environment is constantly monitored, and items which are likely to be of interest are highlighted as the customer moves through the retail environment. In an alternative embodiment, the entry of a customer into a store is detected using the location of the personal computer device and items likely to be of interest based on the profile data are then simultaneously or sequentially highlighted, regardless of where the customer is at a particular point. This can be useful when a store is quite empty where it is only necessary to highlight items which might be of interest to the incoming customer. Both of these embodiments allow illumination to be precisely and carefully controlled, thus reducing wastage and focussing increased light levels only where it is determined to be most effective.

Figure 2:
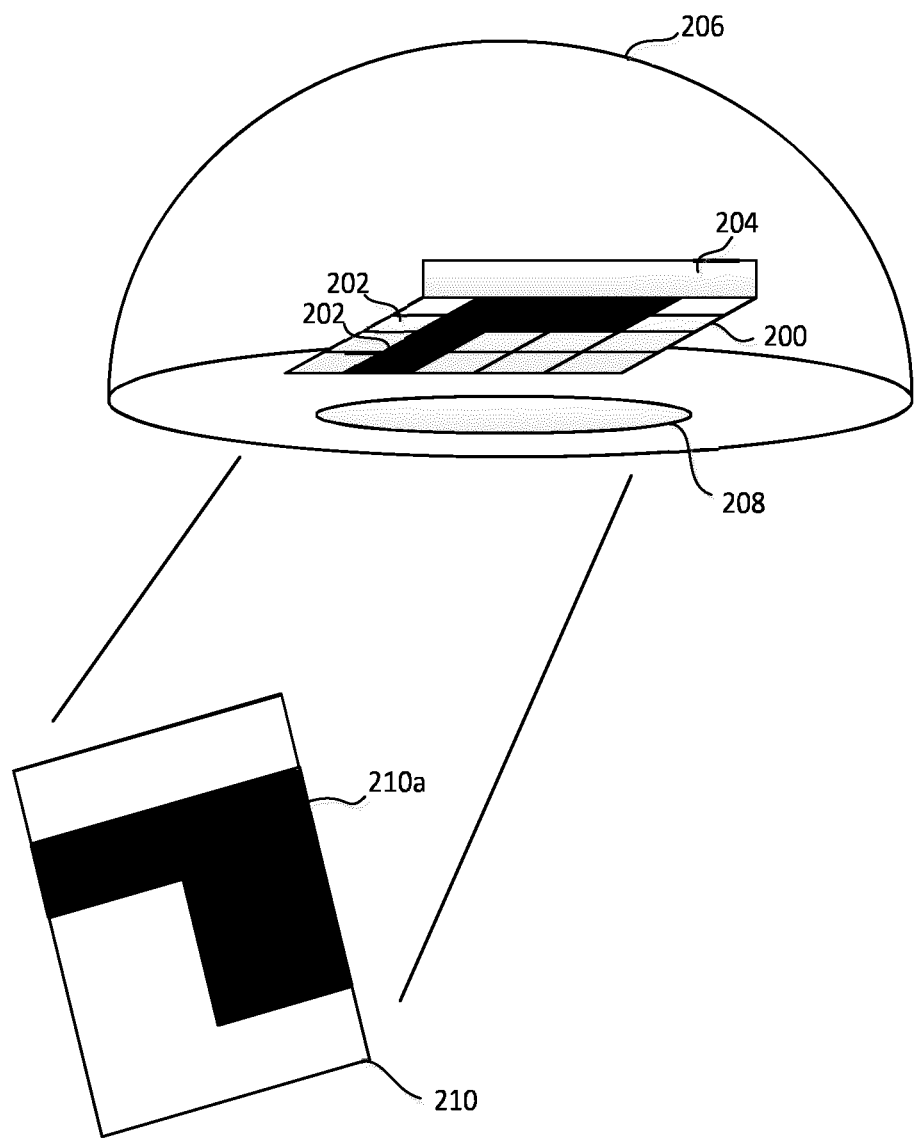
FIG. 2 is a schematic diagram of a matrix lighting component.

One available type of matrix-spotlight is a pixel light. This is currently used in automotive lighting and is used to exactly define automotive lighting beams by projecting an image of the light source to fit the required beam pattern. The beam pattern is precisely shaped by switching on the corresponding light sources (pixels). The system can deliver 8000 lumens, and it is expected that higher lumen levels are achievable as LEDs become more efficient. A matrix controller can be in the form of an integrated circuit on the LED pcb itself FIG. 2 illustrates one example of a matrix-spotlight. The matrix-spotlight comprises an LED matrix array 200 which comprises a plurality of individual light sources, for example, light-emitting diodes 202. The matrix array 200 has a local control circuit 204 which allows each individual light source to be controlled. In FIG. 2, the light sources which are shown darkened represent light sources which have been "turned up" relative to other light sources on the array. The LED matrix is located within a reflector 206 which reflects light from the light sources onto a lens 208. The lens 208 projects a more or less exact image of the matrix array onto a specific area in a shop. If the matrix array includes light sources whose light levels have been increased relative to neighbours in the array, then a slightly enhanced illumination area can be provided, in a very focused way so as to highlight to a shopper a particular item that might be of interest. Reference numeral 210 denotes an area of illumination, where 210a denotes an area of enhanced focused illumination.

Although the matrix spotlight which is shown has a reflector and a lens, an imaging optical system could also work with a lens only. As explained above, a lighting component for lighting a very specific light pattern is used in automotive advanced lighting systems. A system with only a reflector/collimator which is able to highlight a specific zone within the shop using an existing grid of spots could also be utilised.

Figure 3:
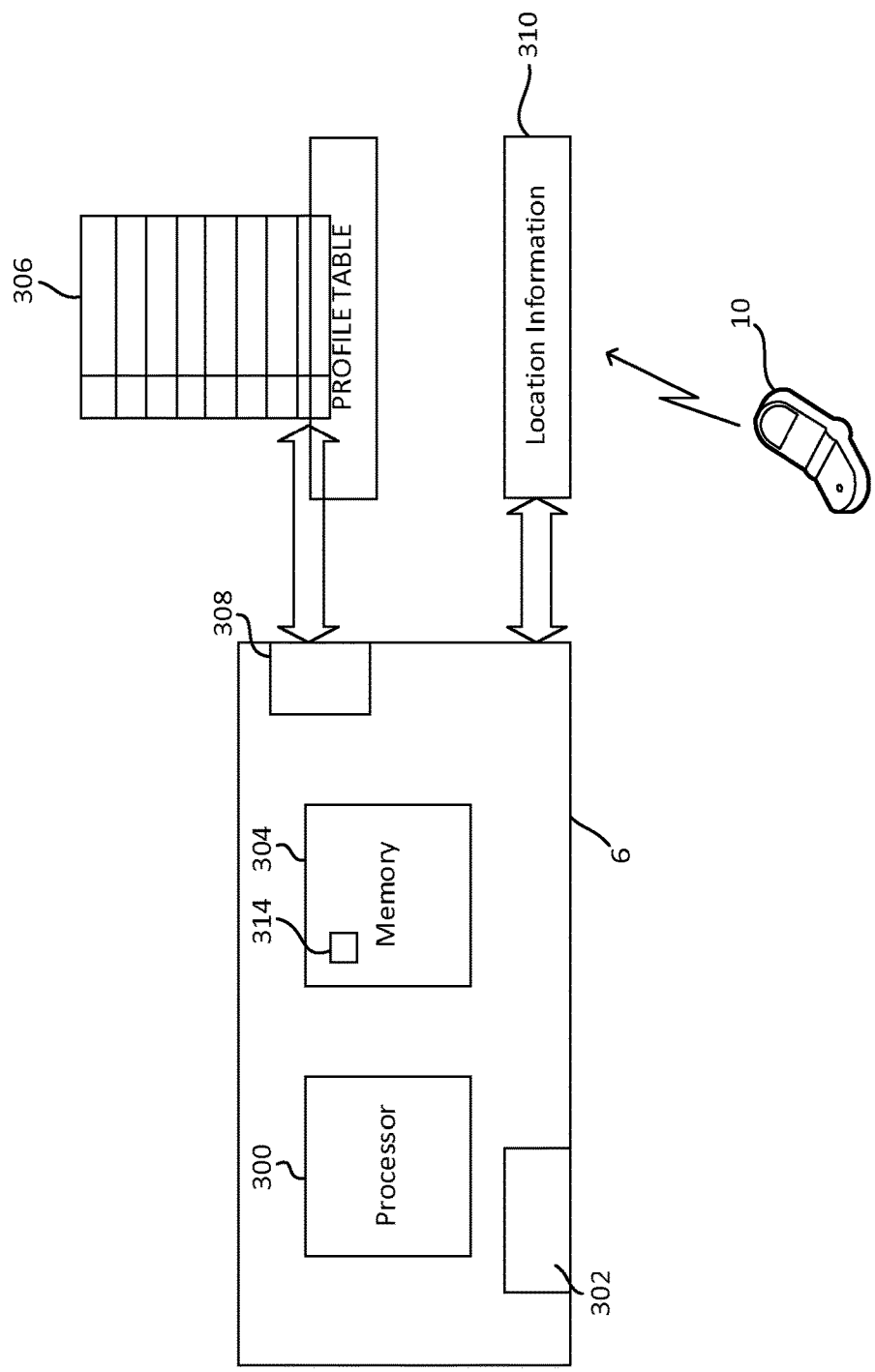
FIG. 3 is a schematic block diagram of a control system.

FIG. 3 is a schematic block diagram of a central controlling system in the form of a controller. The controller comprises a processor 300 which is capable of executing program code to provide control signals to the matrix-spotlights via a light control interface 302. A memory 304 is provided. The memory can contain the appropriate code for controlling the light and/or can contain a profile table 306 which contains online profiles on anonymised individuals. In FIG. 3, the profile table 306 is shown externally of the controller 6. This is because in an alternative embodiment the controller 6 can access the profiles table via a network interface 308 or in any other appropriate way. The profiles in the profile table 306 can be accumulated using known methods. Personal data is collected widely. Online browsing and search history, personal profiles, financial data, purchasing behaviour, client loyalty programmes and family compositions and many other sources of data can be used to identify and predict an individual behaviour. The controller 6 also has access to location information 310 which includes real time locations of an individual person using a personal computer device such as a smartphone. Once again, the access of the controller 6 to this location information is shown only diagrammatically in FIG. 3. In practice, it is likely that the online profiles will be held in a server which is accessible to the controller 6 via a network, and the location information 310 could be held in the same or a different server also accessible to the controller 6 via a network. The location information and the personal profiles can be combined and made anonymous and used to control the matrix-spotlight. Current privacy legislation in some countries allows targeting of individuals based on a combination of their personal data and location as long as the person involved is "anonymous". Thus, the manner in which the controller 6 is configured to access the profile table and the location information ensures that anonymity is preserved.

In the present case, the profile tables mainly contain data about the online purchasing behaviour of an anonymous individual. Online purchasing is increasing, at the expense of purchasing in real stores. Nevertheless, there is evidence that a consumer still values the presence of a real store in order to touch, feel and try a product in real life. Nevertheless, consumer behaviour is changing due to online experiences in a sense that consumers are becoming less patient to spend the time in a real life shopping environment to find the product that they are looking for. The embodiments of the invention described herein enable a retailer to assist a customer to quickly locate the product that they might be interested in, thereby making the purchasing experience more efficient for the customer, and less wasteful of shop resources.

The techniques described herein help a retailer to create a bridge between online and offline shopping. The lighting system, including the controller and matrix-spotlight, are connected to the combined data of purchasing information, online search history and the anonymous location identification inside personal computer devices such as smartphones to highlight the most interesting products for a customer entering the store.

As mentioned above, an appropriate lighting system to implement embodiments of the present invention can use matrix-spotlights. Such a lighting system can cover the full product offering with sufficient light. A possible alternative may be to control and direct retail accent lighting to a certain direction with a motor/actuator. This could be used to redirect accent lighting in a shop towards the personal points of interest for the consumer. A dynamic moving light however may give the impression that a customer is "being followed". The alternative of the matrix-spotlight avoid this effect because they potentially cover the shop interior with a beam pattern matrix. Each individual light source (pixel) can be controlled separately in order to light up the specific item that the just entering customer viewed the previous evening in an online shop. Modifications can be made to the matrix-spotlight to optimise the accent lighting in any particular environment. For example, the matrix array can be varied in resolution. In one example, the array can comprise six individual light sources (pixels) of 2000 lumen each, and in another example to achieve a similar lumen output, the matrix array can comprise 12 light sources (pixels) with 1000 lumen each. With a larger number of pixels in the matrix array, there can be a better highlighting resolution of a specific item.

The matrix array can be designed to deliver different light intensities depending on the environment in which it is to be utilised. That is, the total lumen output can vary from low lumen to high lumen packages.

The beam quality can be varied, depending on the cost investment for the structure. A beam could be provided which exactly defines each pixel, or a more basic beam quality using an array of overlapping beam patterns can be provided to cover the merchandise.

Additionally, multiple matrix-spotlights can illuminate the same matrix area in the store, accumulating the targeting highlight effect and lighting the item from multiple directions. If, when using a pixel light LED array there are overlapping beams, it is possible to commission the beams in relation to specific items or articles. A sensor can be added which is able to detect the location of a specific light projection which switches each light element (pixel) in, one after another, to enable the lighting system to be auto commissioned. The system is then able to detect overlap of beams and is able to create a seamless lighting grid (matrix location).

A highlight can be created by giving the highlight a different white colour, such as a cool white in a warm white general lighting or warm white in a cool white basic lighting level. That is, instead of increasing the lumen level to provide enhanced illumination, the item can be picked out by using a different colour.

When no data is available on the specific anonymous customer, the location of the customer can be used to highlight the articles in his direct surroundings, saving on energy use with only a few customers are in the store.

Figure 4:
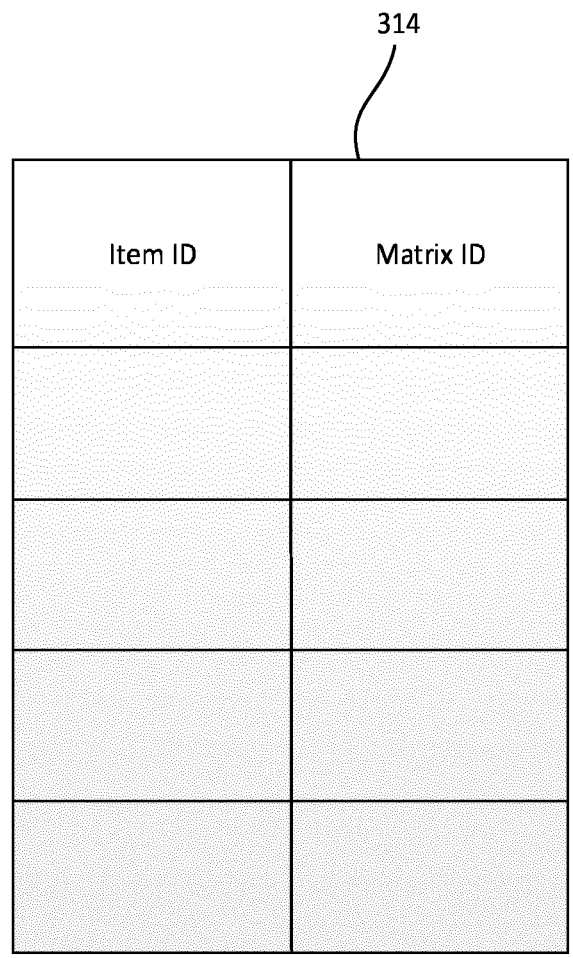
FIG. 4 is a diagram of an association table stored in the memory of the control system.

As mentioned above, the controller 6 controls the matrix-spotlights 4a, 4b, etc., to highlight items which have been determined from the profile information to be of interest to the incoming customer. To achieve this, the controller needs to have a map or layout of the store to be able to identify the location of the item which has been determined as being a possible interest, so that it can be highlighted. It also (optionally) compares the location of the customer with the location in the store of items which are determined as being of possible interest to highlight those items which are in the proximate location of the customer. The layout of the store can be made by scanning RFID tags of items. The scanned items can then be associated with the particular matrix-spotlight which could be used to highlight them in an association table 314. FIG. 4 illustrates schematically an association table in which an identifier of each item ID is associated with an identifier of each matrix-spotlight matrix ID. The identifier of each matrix-spotlight uniquely identifies its location in the store. The association table 314 can be held in the memory 304 or can be available in a separate store accessible by the controller 6.

Figure 5:
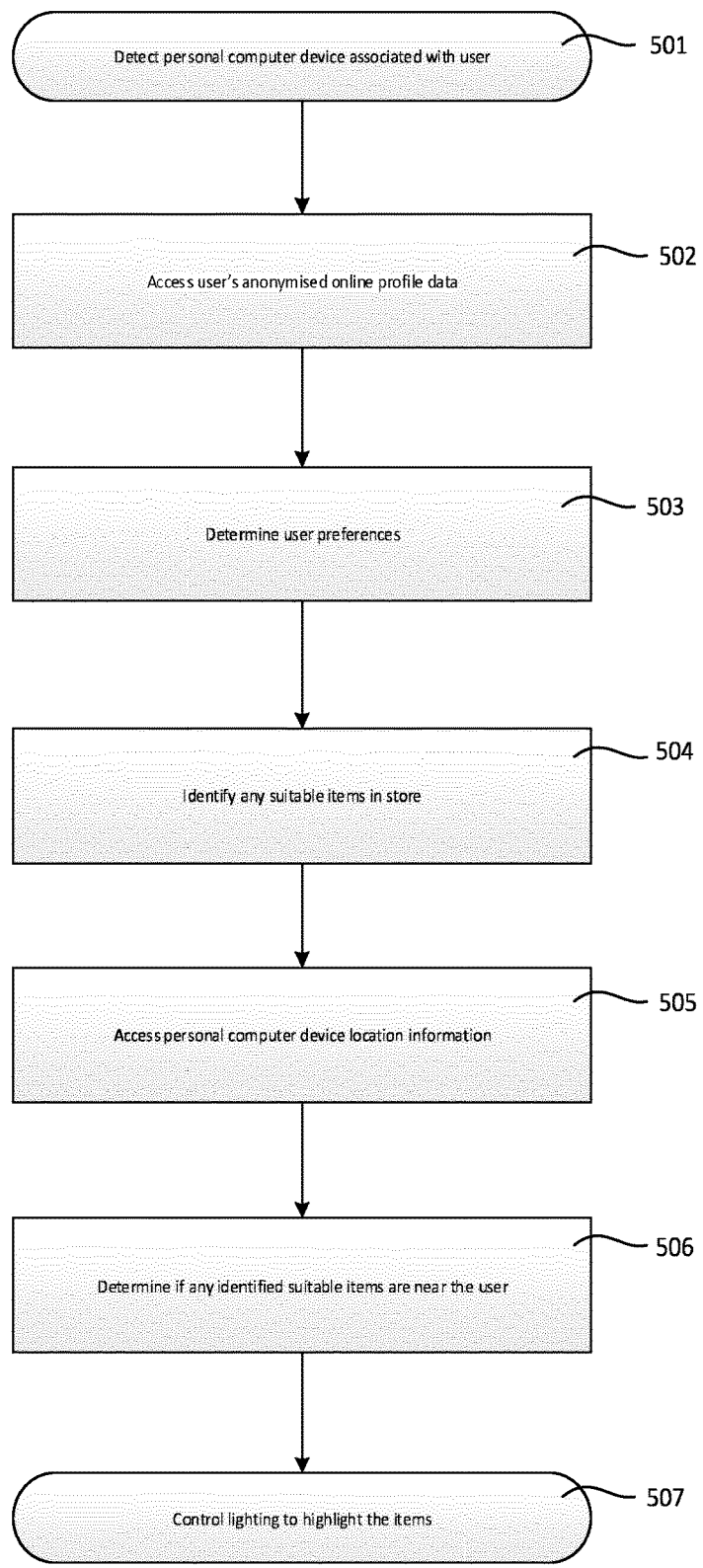
FIG. 5 is a flow chart.

FIG. 5 is a flow chart illustrating steps of a method in accordance with one embodiment. At step 501, a personal computer device associated with a customer entering a space is detected. At step 502, the customer's anonymised online profile data is accessed using information detected on the personal computer device. At step 503, the user preferences are determined. At step 504, any items which are instore corresponding to the user preferences are determined. At step 505, location information pertaining to the personal computer device is accessed and at step 506, it is determined if there are any identified suitable items near the user. If so, at step 507, the lighting installation is controlled to highlight the items which are near the user's current location.

As mentioned, to access the customer's anonymized online profile data, this is achieved by using information detected from the personal computer device (user device) 10. As will be appreciated by a person skilled in the art once given the present disclosure, the information detected for this purpose may take various forms.

For instance, the controller 6 may be arranged to detect information from the personal computer device 10 in the form of an identifier of the personal computer device, such as a MAC address or IP address of the device 10. In this case, the profile table 306 on the server maps device IDs to respective online profiles of online activity conducted through the respective devices, and the controller 6 is arranged to use the detected ID of the detected personal computer device 10 to look up the associated online profile mapped to that ID in the profile table 306 (as long as that same profile table 306 does not also map the device ID or profile to any personal identifier of the user, such as a personal name, home address, email address or VOIP ID, etc., then this process remains anonymous).

As another example, the user of the personal computer device 10 may have registered with the lighting service discussed above, and thus have been assigned a dedicated user ID of the lighting system that has no other meaning outside the lighting service (i.e. is not a personal name, home address, email address or VOIP address, etc.). In this case, the information detected from the personal computer device comprises this dedicated user ID of the lighting system, and the profile table 306 maps such registered user IDs of the lighting system to respective online profiles of the respective users. The controller 6 is arranged to then look up the associated profile mapped to the detected user ID in the profile table 306 (as long as the profile table 306 does not also map the dedicated lighting system user ID to any personal identifier of the user, such as a personal name, home address, email address or VOIP ID, etc., then this process remains anonymous).

As yet another example, the information detected from the personal computer device 10 may comprise the online profile data itself, rather than some other piece of information used to look up the profile in a profile table 306 on a server. In this case, assuming the user of the personal computer device 10 has made the profile data available to the lighting system directly from his/her device 10, then the controller 6 can access the profile data directly without needing to access a look-up table or server (and the profile can remain anonymous as the controller does not need to know an identifier of the user performing any such look-up).

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of controlling a lighting installation in a space in which a plurality of items are displayed, the method comprising:
   detecting a personal computer device in the space, the personal computer device associated with an anonymised user, said detection including detecting information on the personal computer device;
   by using said information detected on the personal computer device, accessing individual profile data associated with the anonymised user derived from previous online activity of the anonymised user;
   determining items likely to be of interest to the anonymised user associated with the personal computer device based on said individual profile data; and
   controlling at least one lighting component to provide distinguishing illumination directed towards at least one of the determined items, wherein the at least one of the determined items is at least one nonhuman item that has mass.

2. A method according to claim 1, wherein the location of the personal computer device in the space is detected, and the at least one of the determined items is proximate the detected location of the personal computer device.

3. A method according to claim 1, wherein the step of providing distinguishing illumination comprises providing relatively enhanced illumination.

4. A method according to claim 3, wherein the relatively enhanced illumination provides a highlight effect.

5. A method according to claim 3, wherein the relatively enhanced illumination provides a highlight of a different shade or colour.

6. A method according to claim 1, wherein the step of controlling at least one lighting component comprises controlling a fixed array of individual light sources wherein one or more individual light sources is selected to provide a direct beam of the distinguishing illumination.

7. A method according to claim 1, wherein the step of controlling at least one lighting component comprises mechanically moving a spotlight to provide a beam of distinguishing illumination directed towards the at least one item.

8. A method according to claim 1, wherein the step of detecting the location of the personal computer device comprises detecting a location identification signal from the personal computer device.

9. A method according to claim 1, wherein multiple lighting components are controlled to provide an accumulated enhanced lighting effect for the at least one of the determined items from multiple directions.

10. A computer system for controlling a lighting installation in a space in which a plurality of items are displayed, the computer system comprising:
    at least one hardware processor for detecting a personal computer device in the space, including detecting information on the personal computer device;
    using said information detected on the personal computer device, the processor configured to access individual profile data associated with an anonymised user linked with the personal computer device, the individual profile data derived from previous online activity of the anonymised user;
    wherein the processor is configured to determine at least one item likely to be of interest to the anonymised user associated with the personal computer device based on said individual profile data, and to generate a control signal for controlling at least one lighting component of the lighting installation to provide distinguishing illumination directed towards the determined item, wherein the determined item is at least one nonhuman item that has mass; and
    a control interface for transmitting the generated control signal to the at least one lighting component.

11. A computer system according to claim 10, wherein the processor is configured to detect a location identification signal from the personal computer device.

12. A computer system according to claim 10, further comprising a network interface which is configured to be connected to a network allowing communication with a store holding said individual profile data.

13. A computer system according to claim 10, which comprises electronic storage holding an association between each corresponding item displayed in the space and a lighting component suitable for directing illumination towards the region where the corresponding item is displayed.

14. A computer system according to claim 10, wherein the processor is operable to detect the location of the personal computer device in the space, and wherein the distinguishing illumination is directed towards the determined item which is proximate the detected location of the personal computer device.

15. A lighting installation for use in a space in which a plurality of items are displayed, the lighting installation comprising:
 a computer system according to claim 10, and a plurality of lighting components arranged to provide distinguishing illumination directed towards different regions in the space, wherein the lighting components operate under the control of the computer system to provide distinguishing illumination directed towards items determined to be likely to be of interest to the anonymised user associated with a personal computer device detected in the space.

16. A method of controlling a lighting installation in a space in which a plurality of items are displayed, the method comprising:
 detecting a personal computer device in the space, the personal computer device associated with a user, said detecting including detecting information on the personal computer device;
 by using said information detected on the personal computer device, accessing individual profile data associated with the user derived from previous online activity of the user;
 determining at least one nonhuman item having mass likely to be of interest to the user associated with the personal computer device based on said individual profile data; and
 controlling at least one lighting component to provide distinguishing illumination directed towards the determined nonhuman item in response to said determining.

* * * * *